(12) United States Patent
Wang et al.

(10) Patent No.: US 12,477,438 B2
(45) Date of Patent: Nov. 18, 2025

(54) NEIGHBORING CELL RELATIONSHIP CONFIGURATION METHOD AND APPARATUS APPLICABLE TO SATELLITE NETWORK

(71) Applicant: HUAWEI TECHNOLOGIES CO., LTD., Guangdong (CN)

(72) Inventors: Yu Wang, Hangzhou (CN); Jun Wang, Hangzhou (CN); Dali Qin, Hangzhou (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 17/707,207

(22) Filed: Mar. 29, 2022

(65) Prior Publication Data

US 2022/0225208 A1 Jul. 14, 2022

Related U.S. Application Data

(63) Continuation of application No. PCT/CN2020/116004, filed on Sep. 17, 2020.

(30) Foreign Application Priority Data

Sep. 30, 2019 (CN) .......................... 201910943033.2

(51) Int. Cl.
    *H04W 40/24* (2009.01)
    *H04W 84/06* (2009.01)
(52) U.S. Cl.
    CPC ................................. *H04W 40/248* (2013.01)
(58) Field of Classification Search
    None
    See application file for complete search history.

(56) References Cited

U.S. PATENT DOCUMENTS

| 5,483,664 A | * | 1/1996 | Moritz | ............... | H04B 7/18541 |
|---|---|---|---|---|---|
| | | | | | 455/12.1 |
| 5,649,291 A | * | 7/1997 | Tayloe | ............... | H04B 7/18541 |
| | | | | | 370/332 |

(Continued)

FOREIGN PATENT DOCUMENTS

| CN | 104219718 A | 12/2014 |
|---|---|---|
| CN | 108964814 A | 12/2018 |

(Continued)

OTHER PUBLICATIONS

3GPP TS 36.300 V15.7.0 (Sep. 2019), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Sep. 2019, 360 pages.

(Continued)

*Primary Examiner* — Scott M Sciacca
(74) *Attorney, Agent, or Firm* — Fish & Richardson P.C.

(57) ABSTRACT

Example neighboring cell relationship configuration methods and apparatus are described. One example method includes: generating a neighboring cell status function identifier by a satellite, where the neighboring cell status function identifier can be used to indicate an inactive state of at least one neighboring cell of a satellite cell. The satellite sends neighboring cell relationship configuration information that includes the neighboring cell status function identifier to a communications device, and the communications device determines a configuration status of a corresponding neighboring cell based on the neighboring cell relationship configuration information.

20 Claims, 12 Drawing Sheets

(56) References Cited

U.S. PATENT DOCUMENTS

| | | | | |
|---|---|---|---|---|
| 5,678,184 | A * | 10/1997 | Cutler, Jr. | H04B 7/18541 455/13.1 |
| 2009/0264130 | A1 * | 10/2009 | Catovic | H04W 24/02 455/436 |
| 2012/0026918 | A1 * | 2/2012 | Won | H04W 36/0061 370/255 |
| 2016/0029253 | A1 * | 1/2016 | Sarkar | H04W 36/0016 455/436 |
| 2018/0242392 | A1 * | 8/2018 | Liu | H04L 45/021 |
| 2019/0245614 | A1 | 8/2019 | Lucky et al. | |
| 2022/0109497 | A1 * | 4/2022 | Metsala | H04B 7/1853 |
| 2022/0167229 | A1 * | 5/2022 | Chou | H04W 24/02 |

FOREIGN PATENT DOCUMENTS

| | | |
|---|---|---|
| WO | 2011138563 A1 | 11/2011 |
| WO | 2018052744 A2 | 3/2018 |
| WO | 2018176415 A1 | 10/2018 |

OTHER PUBLICATIONS

3GPP TS 38.300 V15.7.0 (Sep. 2019), "3rd Generation Partnership Project; Technical Specification Group Radio Access Network; NR; NR and NG-RAN Overall Description; Stage 2 (Release 15)," Sep. 2019, 99 pages.

CATT et al., "Cell Selection and Reselection Issue in NTN System," 3GPP TSG-RAN WG2 Meeting #106, R2-1905873, Reno, USA, May 13-17, 2019, 3 pages.

Ericsson et al., "Network Identities for Non-Terrestrial Networks," 3GPP TSG-RAN WG3 #103, R3-190810, Athens, Greece, Feb. 25-Mar. 1, 2019, 4 pages.

Huawei et al., "Handling of Network Identities in NTN," 3GPP TSG-RAN WG3 Meeting #103, R3-190645, Athens, Greece, Feb. 25-Mar. 1, 2019, 4 pages.

Nokia et al., "NTN Network Identities, " 3GPP TSG-RAN WG3 #103, R3-190448, Athens, Greece, Feb. 25-Mar. 1, 2019, 3 pages.

Office Action issued in Chinese Application No. 201910943033.2 on Nov. 1, 2021, 7 pages (with English translation).

PCT International Search Report and Written Opinion issued in International Application No. PCT/CN2020/116004 on Dec. 16, 2020, 13 pages (with English translation).

Huawei, "Introduction of additional enhancements for NB-IoT," 3GPP TSG-WG2 Meeting #107, R2-1910160, Prague, Czech Republic, Aug. 26-30, 2019, 40 pages.

ZTE Corporation et al., "Consideration on system information update in NTN," 3GPP TSG-RAN WG2 Meeting#107, R2-1909264, Prague, Czech, Aug. 26-30, 2019, 6 pages.

Huawei, "The neighbour cells management in NTN," 3GPP TSG-RAN WG3 Meeting #104, R3-192732, Reno, Nevada, US, May 13-17, 2019, 4 pages.

Extended European Search Report in European Appln No. 20870872.7, dated Oct. 19, 2022, 12 pages.

Office Action in Japanese Appln. No. 2022-519843, dated Apr. 25, 2023, 6 pages (with English translation).

* cited by examiner

Neighboring cell relationship table

*Neighboring cell relationship*       *O&M neighboring cell relationship control attribute*

| NR | Neighboring cell sequence number (TCI) | Non-removal | Non-HO | Non-X2 | Inactive |
|---|---|---|---|---|---|
| 1 | TCI #1 |  |  |  |  |
| 2 | TCI #2 | ✓ |  | ✓ |  |
| 3 | TCI #3 | ✓ |  |  | T1, T2<br>T1, offset<br>T2, offset |
|  |  |  |  |  |  |

FIG. 6

NEIGHBORING CELL RELATIONSHIP CONFIGURATION METHOD AND APPARATUS APPLICABLE TO SATELLITE NETWORK

CROSS-REFERENCE TO RELATED APPLICATIONS

This application is a continuation of International Application No. PCT/CN2020/116004, filed on Sep. 17, 2020, which claims priority to Chinese Patent Application No. 201910943033.2, filed on Sep. 30, 2019. The disclosures of the aforementioned applications are hereby incorporated by reference in their entireties.

TECHNICAL FIELD

Embodiments of this application relate to the field of communications technologies, and in particular, to a neighboring cell relationship configuration method and an apparatus that are applicable to a satellite network.

BACKGROUND

Satellite communication has prominent advantages such as global coverage, long-distance transmission, flexible networking, convenient deployment, and being not restricted by geographical conditions, and has been widely applied to a plurality of fields such as maritime communication, positioning and navigation, disaster relief, scientific experiments, video broadcasting, and earth observation.

In satellite communication, especially in non-geostationary earth orbit (Non-Geostationary Earth Orbit, NGEO) satellite communication, NGEO satellites may be classified into a low earth orbit (Low Earth Orbit, LEO) satellite and a medium earth orbit (Medium Earth Orbit, MEO) satellite, and a neighboring cell relationship presents dynamically changing features: (1) When satellites move to a high-latitude (away from the equator) region, an overlapping part of coverage areas of the satellites increases, and inter-beam interference is enhanced. This is not conducive to communication with a terminal. Interference between different beams of the satellites can be reduced by disabling some beams at a satellite edge. FIG. 1a provides a four-color frequency reuse method. System bandwidth is equally divided into four frequency bands, and center frequencies of the frequency bands may be separately f1, f2, f3, and f4. Adjacent beams in the satellite communicate with each other at different frequencies, to suppress inter-beam interference. FIG. 1b shows beam coverage situations of three satellites based on a four-color frequency reuse solution. A satellite 2 separately has overlapping coverage areas with a satellite 1 and a satellite 3, and beams of six cells at an outer edge of the satellite 2 may be disabled to suppress interference. (2) Due to movement of the satellite, a terrestrial cell covered by a satellite cell changes with time; in other words, a terrestrial neighboring cell relationship changes. As shown in FIG. 2, at a moment T1, a terrestrial cell 1 and a terrestrial cell 2 are within a coverage area of a satellite cell 1; in other words, the terrestrial cell 1 and the terrestrial cell 2 are neighboring cells of the satellite cell 1. At a moment T2, due to movement of the satellite, the terrestrial cell 1 and the terrestrial cell 2 move out of the coverage area of the satellite cell 1; in other words, the terrestrial cell 1 and the terrestrial cell 2 are no longer neighboring cells of the satellite cell 1 in this case. Therefore, the terrestrial cells 1 and 2 need to be deleted from a neighboring cell relationship table of the satellite. This operation is performed extremely frequently in an existing protocol framework, and a large quantity of signaling overheads are caused.

SUMMARY

Embodiments of this application provide a neighboring cell relationship configuration method and an apparatus that are applicable to a satellite network, to efficiently maintain a large amount of terrestrial neighboring cell relationship information.

Specific technical solutions provided in this application are as follows: According to a first aspect, a communication method is provided. The method may be performed by a terrestrial communications device, such as a handheld satellite phone, a terrestrial station, or a terminal that can perform communication by using a satellite network. The communications device receives neighboring cell relationship configuration information, the neighboring cell relationship configuration information includes a neighboring cell status function identifier, and the neighboring cell status function identifier is used to indicate an inactive state of at least one neighboring cell of a first satellite cell. The communications device determines a configuration status of the corresponding neighboring cell based on the neighboring cell relationship configuration information.

According to a second aspect, a communication method is provided. The method may be performed by a satellite, such as an LEO satellite or an MEO satellite, or a high altitude platform station in some cases. The satellite generates a neighboring cell status function identifier, where the neighboring cell status function identifier is used to indicate an inactive state of at least one neighboring cell of a first satellite cell. The satellite sends neighboring cell relationship configuration information, where the neighboring cell relationship configuration information includes the neighboring cell status function identifier.

With reference to content of the first aspect and the second aspect, the solutions in this application may be understood macroscopically. When a neighboring cell relationship of the satellite dynamically changes (for example, some cells are temporarily disabled but are enabled after a period of time), only a value of the neighboring cell status function identifier needs to be changed, and a neighboring cell addition function and a neighboring cell removal function do not need to be frequently performed on an NCRT. Therefore, signaling overheads are reduced. If the neighboring cell status function identifier indicates that an activation status of the neighboring cell is an active (Active) state, the current neighboring cell is an available neighboring cell and can be used for cell handover or reselection. If the neighboring cell status function identifier indicates that the current neighboring cell is in an inactive (Inactive) state, the current cell is an unavailable neighboring cell and cannot be used as a target cell for handover or reselection.

In a possible implementation of the foregoing aspects, the satellite generates the neighboring cell status function identifier based on the reference information, and the reference information includes at least one item of the following content: storage space of the neighboring cell, a computing capability of the neighboring cell, an X2 interface capability, ephemeris information, and feedback information sent after a terminal performs measurement.

In a possible implementation, the inactive state of the neighboring cell includes a time interval of the inactive state of the neighboring cell.

More specifically, the time interval of the inactive state of the neighboring cell includes at least one item of the following content: a start time point of the inactive state of the neighboring cell, an end time point of the inactive state of the neighboring cell, an offset of the start time point of the inactive state of the neighboring cell, and an offset of the end time point of the inactive state of the neighboring cell. In this implementation, in addition to indicating whether the neighboring cell is in an active state, a time situation of the inactive state may be further indicated. Therefore, indication information is richer, and frequent signaling overheads caused by a dynamic neighboring cell relationship change are also reduced.

In a possible implementation, the neighboring cell status function identifier is used to indicate inactive states of two neighboring cells of the first satellite cell, and the inactive states of the two neighboring cells are coupled or mutually exclusive. An inactive-state indication based on a neighboring cell group may be presented in a specific manner by an inactive-state indication of each neighboring cell in the neighboring cell group. In this manner, neighboring cell groups are maintained in a unified manner, entries are simplified, and indication information overheads are reduced.

In a possible implementation, the neighboring cell relationship configuration information includes a neighboring cell type, and the neighboring cell type is used to indicate whether the neighboring cell is a cluster head terrestrial cell. In this implementation, the satellite needs to maintain only a neighboring cell relationship of the cluster head terrestrial cell, so that storage overheads of the NCRT are reduced.

In a possible implementation, the neighboring cell relationship configuration information is sent by using a broadcast message or by using a radio resource control RRC message.

In a possible implementation, the satellite sends a request to the cluster head terrestrial cell, and the request enables the cluster head terrestrial cell to feed back neighboring cell relationship configuration information of a cell associated with the cluster head terrestrial cell. The satellite receives the neighboring cell relationship configuration information that is of the cell associated with the cluster head terrestrial cell and that is fed back by the cluster head terrestrial cell.

According to a third aspect, a communications apparatus is provided, and the apparatus may be a terminal device (for example, a satellite phone or a satellite communications device), an apparatus (for example, a chip, a chip system, or a circuit) in the terminal device, or may be an apparatus that can be used in conjunction with the terminal device. In a design, the apparatus may include modules that are in a one-to-one correspondence with the method/operations/steps/actions described in the first aspect. The modules may be implemented by a hardware circuit, software, or a combination of the hardware circuit and the software. In a design, the apparatus may include: a receiving module, configured to receive neighboring cell relationship configuration information, where the neighboring cell relationship configuration information includes a neighboring cell status function identifier, and the neighboring cell status function identifier is used to indicate an inactive state of at least one neighboring cell of a first satellite cell; and a processing module, configured to determine a configuration status of the neighboring cell based on the neighboring cell relationship configuration information.

In a possible implementation of the third aspect, the receiving module receives the neighboring cell relationship configuration information sent by using a broadcast message or a radio resource control RRC message.

According to a fourth aspect, a communications apparatus is provided, and the apparatus may be a network device (for example, an LEO satellite, an MEO satellite, or a high altitude platform station), an apparatus (for example, a chip, a chip system, or a circuit) in the network device, or may be an apparatus that can be used in conjunction with the terminal device. In a design, the apparatus may include modules that are in a one-to-one correspondence with the method/operations/steps/actions described in the second aspect. The modules may be implemented by a hardware circuit, software, or a combination of the hardware circuit and the software. In a design, the apparatus includes a generation module and a sending module. The generation module is configured to generate a neighboring cell status function identifier, where the neighboring cell status function identifier is used to indicate an inactive state of at least one neighboring cell of a first satellite cell. The sending module is configured to send neighboring cell relationship configuration information, where the neighboring cell relationship configuration information includes the neighboring cell status function identifier.

In a possible implementation of the fourth aspect, the apparatus further includes an input module. The input module is configured to input reference information. The generation module is configured to generate the neighboring cell status function identifier based on the reference information, and the reference information includes at least one item of the following content: storage space of the neighboring cell, a computing capability of the neighboring cell, an X2 interface capability, and ephemeris information.

In a possible implementation of the fourth aspect, the sending module is configured to send a request to the cluster head terrestrial cell, and the request enables the cluster head terrestrial cell to feed back neighboring cell relationship configuration information of a cell associated with the cluster head terrestrial cell.

In a possible implementation of the fourth aspect, the apparatus further includes a receiving module, configured to receive the neighboring cell relationship configuration information that is of the cell associated with the cluster head terrestrial cell and that is fed back by the cluster head terrestrial cell.

In a possible implementation of the third or fourth aspect, the inactive state of the neighboring cell includes a time interval of the inactive state of the neighboring cell.

More specifically, the time interval of the inactive state of the neighboring cell includes at least one item of the following content: a start time point of the inactive state of the neighboring cell, an end time point of the inactive state of the neighboring cell, an offset of the start time point of the inactive state of the neighboring cell, and an offset of the end time point of the inactive state of the neighboring cell.

In a possible implementation of the third or fourth aspect, the neighboring cell status function identifier is used to indicate inactive states of two neighboring cells of the first satellite cell, and the inactive states of the two neighboring cells are coupled or mutually exclusive.

In a possible implementation of the third or fourth aspect, the neighboring cell relationship configuration information includes a neighboring cell type, and the neighboring cell type is used to indicate whether the neighboring cell is a cluster head terrestrial cell.

In a possible implementation of the fourth aspect, the neighboring cell relationship configuration information is sent by using a broadcast message, a radio resource control RRC message, or an Xn interface application protocol XnAP.

In a possible implementation of the fourth aspect, the satellite sends a request to the cluster head terrestrial cell, and the request enables the cluster head terrestrial cell to feed back neighboring cell relationship configuration information of a cell associated with the cluster head terrestrial cell. The satellite receives the neighboring cell relationship configuration information that is of the cell associated with the cluster head terrestrial cell and that is fed back by the cluster head terrestrial cell.

According to a fifth aspect, a communications apparatus is provided, and the communications apparatus may be the satellite in the foregoing method embodiments, or may be a chip disposed in the satellite. The apparatus includes a processor and a memory. Optionally, the apparatus further includes a transceiver. The processor and the memory are electrically coupled; the memory is configured to store computer program instructions; the processor is configured to execute some or all computer program instructions in the memory, and when the some or all computer program instructions are executed, the method in any one of the first aspect or the possible implementations of the first aspect or the method in any one of the second aspect or the possible implementations of the second aspect is performed. In a possible design, the chip system further includes a transceiver, and the transceiver is configured to send a signal processed by the processor or receive a signal and input the signal to the processor. The chip system may include a chip, or may include a chip and another discrete device.

According to a sixth aspect, a computer program product is provided, and the computer program product includes computer program code. When the computer program code is run on a computer, the computer is enabled to perform the method in any one of the first aspect or the possible implementations of the first aspect or the method in any one of the second aspect or the possible implementations of the second aspect.

According to a seventh aspect, a computer-readable storage medium is provided, the computer-readable storage medium stores a computer program, and when the computer program is run, the method in any one of the first aspect or the possible implementations of the first aspect or the method in any one of the second aspect or the possible implementations of the second aspect is performed.

According to an eighth aspect, a satellite communications system is provided, and the system may include a communications device that performs the method in any one of the first aspect or the possible implementations of the first aspect and a satellite that performs the method in any one of the second aspect or the possible implementations of the second aspect.

BRIEF DESCRIPTION OF THE DRAWINGS

FIG. 6 shows a neighboring cell relationship table NCRT according to an embodiment of this application;

DETAILED DESCRIPTION OF THE DISCLOSED EMBODIMENTS

Figure 1A:
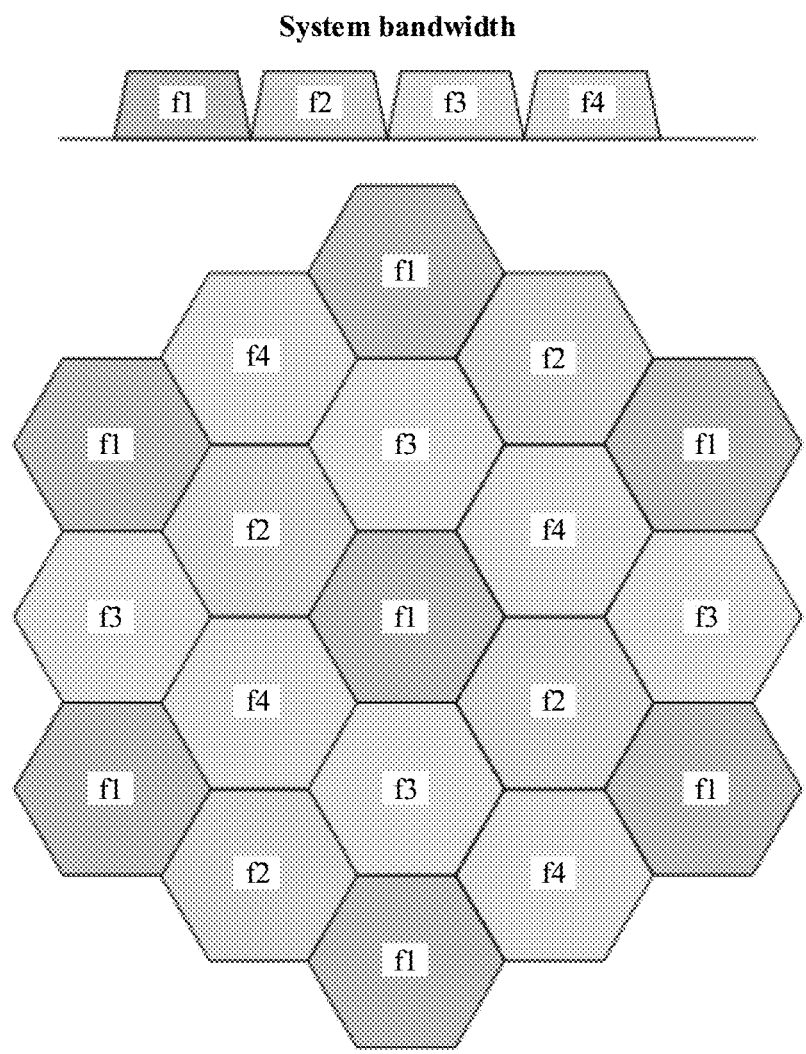
FIG. 1a shows a four-color frequency reuse method according to this application.
Figure 1B:
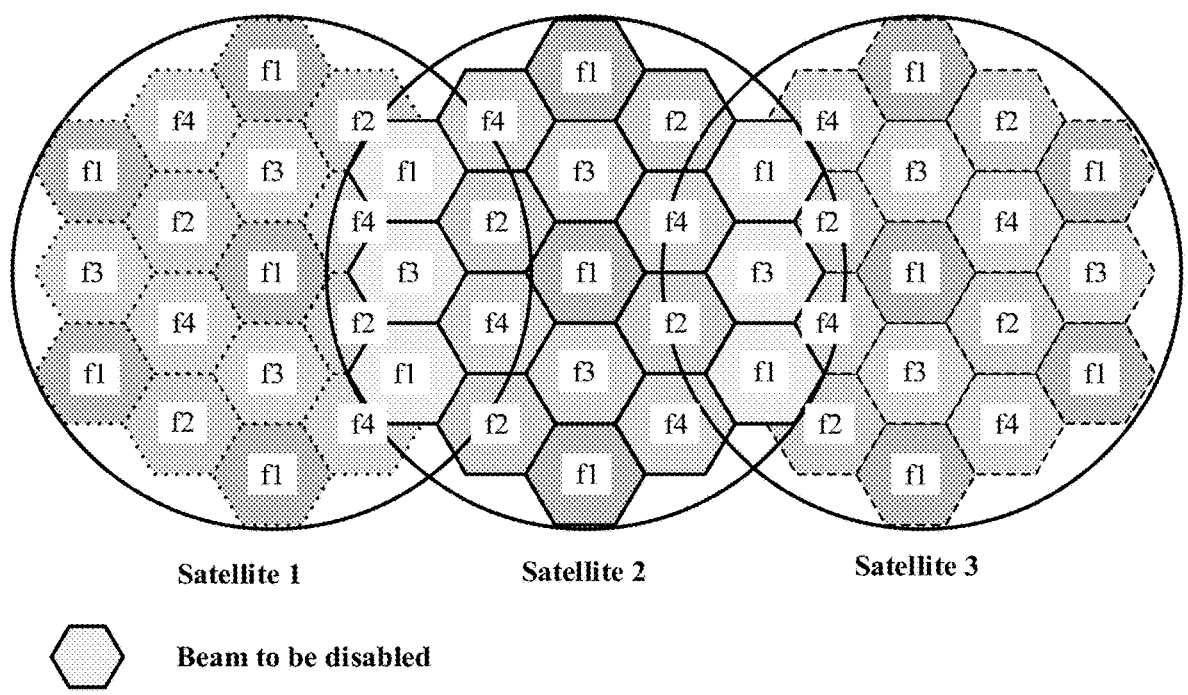
FIG. 1b is a schematic diagram of beam coverage situations of three satellites based on a four-color frequency reuse solution.

The following describes in detail embodiments of this application with reference to the accompanying drawings.

To help a reader understand the embodiments of this application, some terms used in the embodiments of this application are explained and described first. It may be understood that the following terms are used to help the reader better understand application scenarios and technical solutions of this application, so that the reader can quickly understand technical features in the solutions through explanations of the terms, and the explanations of the terms do not constitute an absolute limitation on the technical features.

(1) A terminal is also referred to as user equipment (user equipment, UE), a mobile station (mobile station, MS), a mobile terminal (mobile terminal, MT), or the like, and is a device that provides voice and/or data connectivity for a user. For example, terminal devices include a handheld device that has a wireless connection function, a vehicle-mounted device, an internet of things device, and the like. Currently, the terminal device may be a mobile phone (mobile phone), a tablet, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. The terminal device may alternatively be a terminal device in a 5G network, a terminal device in a public land mobile network (Public Land Mobile Network, PLMN) evolved in the future, a terminal device in another communications system in the future, or the like.

(2) A network device is a device configured to communicate with the terminal device. The network device may be a base station, or may be an evolved NodeB (evolved NodeB, eNB or eNodeB) in an LTE system, or may be a radio controller in a cloud radio access network (cloud radio access network, CRAN) scenario; or the network device may be a relay station, an access point, a vehicle-mounted device, a next-generation NodeB (next generation Node B, gNodeB) in a 5G network, or the like. The network device mentioned in the embodiments of this application may alternatively be a satellite that is alternatively referred to as a satellite base station. The satellite base station mainly provides a radio access service for the terminal device, schedules a radio resource for the terminal device accessing the satellite base station, and provides a reliable radio transmission protocol, a data encryption protocol, and the like. The satellite base station may alternatively be a base station that uses an artificial earth satellite, a high-altitude vehicle, or the like for wireless communication. The satellite base station may be a geostationary earth orbit (geostationary earth orbit, GEO) satellite, a non-geostationary earth orbit (none-geostationary earth orbit, NGEO) such as a medium earth orbit (medium earth orbit, MEO) satellite or a low earth orbit (low earth orbit, LEO) satellite, a high altitude platform station (High Altitude Platform Station, HAPS), or the like.

(3) A core network (core network) is mainly used for user access control, charging, mobility management, session management, user security authentication, a supplementary service, and the like. In the embodiments of this application, the core network mainly includes a user plane function unit, an access and mobility management function unit, a session management function unit, and a data network. The core network includes a plurality of function units, which may be classified as control plane function entities and data plane function entities. The access and mobility management function (AMF, Access and mobility function) unit is a control plane function entity, and is responsible for user access management, security authentication, and mobility management. The session management function (SMF, Session Management Function) unit is a control plane function entity, is responsible for session management, and is connected to the AMF. The user plane function (UPF, User Plane Function) unit is a data plane function entity, and is responsible for functions such as user plane data transmission management, traffic statistics collection, and lawful interception. The data network is a data plane function entity, and is connected to the UPF. The core network further includes other function units, but the function units are not listed one by one.

(4) A beam is a shape formed by electromagnetic waves emitted by satellite antennas on the surface of the earth, and is like a specific range of beams of a flashlight. A shape of the beam is determined by a transmit antenna. Alternatively, a satellite does not transmit signals at 360°, but transmit signal waves in a specific direction. One satellite cell includes at least one satellite beam. In some cases, the satellite beam may also be considered as a concept of a cell.

(5) A terrestrial cell cluster combines a plurality of terrestrial cells that are adjacent to each other or obtained after division based on a specific attribute, to form the terrestrial cell cluster.

(6) A cluster head terrestrial cell is a cell responsible for maintaining a terrestrial cell within a range of the terrestrial cell cluster. During implementation, the cluster head terrestrial cell specifically refers to a communications device corresponding to the cluster head terrestrial cell, such as a base station. During determining of a neighboring cell relationship table that is of a specific cell and that is based on the cluster head terrestrial cell, it may not be required to maintain a neighboring cell relationship of each terrestrial cell in the terrestrial cell cluster, and only a neighboring cell relationship of a cluster head needs to be considered. When a terrestrial neighboring cell relationship within a range of a terrestrial cell cluster needs to be queried, a satellite neighboring cell may initiate a request to the cluster head terrestrial cell based on information such as a location, and obtain neighboring cell configuration of a corresponding terrestrial cell by using the cluster head terrestrial cell.

(7) Ephemeris information: An ephemeris is a precise location or a track table of celestial body running that changes with time during GPS measurement. The ephemeris is a function of time. A satellite ephemeris may be used to determine a running status of a flying object, such as time, a location, or a speed.

The term "and/or" in this application describes an association relationship for describing associated objects and represents that three relationships may exist. For example, A and/or B may represent the following three cases: Only A exists, both A and B exist, and only B exists. The character "|" generally indicates an "or" relationship between the associated objects.

"A plurality of" in this application means two or more.

In the descriptions of this application, terms such as "first" and "second" are merely used for distinction and description, and should not be understood as an indication or implication of relative importance, or as an indication or implication of an order.

In addition, the term "for example" in the embodiments of this application is used to represent giving an example, an illustration, or a description. Any embodiment or implementation solution described as an "example" in this application should not be explained as being more preferred or having more advantages than another embodiment or implementation solution. Exactly, the word "for example" is used to present a concept in a specific manner.

The embodiments of this application provide an automatic neighboring cell relationship implementation method and an apparatus that are applicable to a satellite network. The method and the apparatus are based on a same technical concept. Because problem resolving principles of the method and the apparatus are similar, for implementations of the apparatus and the method, refer to each other. Repeated parts are not described.

The technical solutions in the embodiments of this application may be applied to various communications systems, for example, a satellite communications system. The satellite communications system may be integrated with a conventional mobile communications system. For example, the mobile communications system may be a 4th generation (4th Generation, 4G) communications system (for example, a long term evolution (long term evolution, LTE) system), a worldwide interoperability for microwave access (worldwide interoperability for microwave access, WiMAX) communications system, a 5th generation (5th Generation, 5G)

communications system (for example, a new radio (new radio, NR) system), or a mobile communications system in the future.

Figure 3:
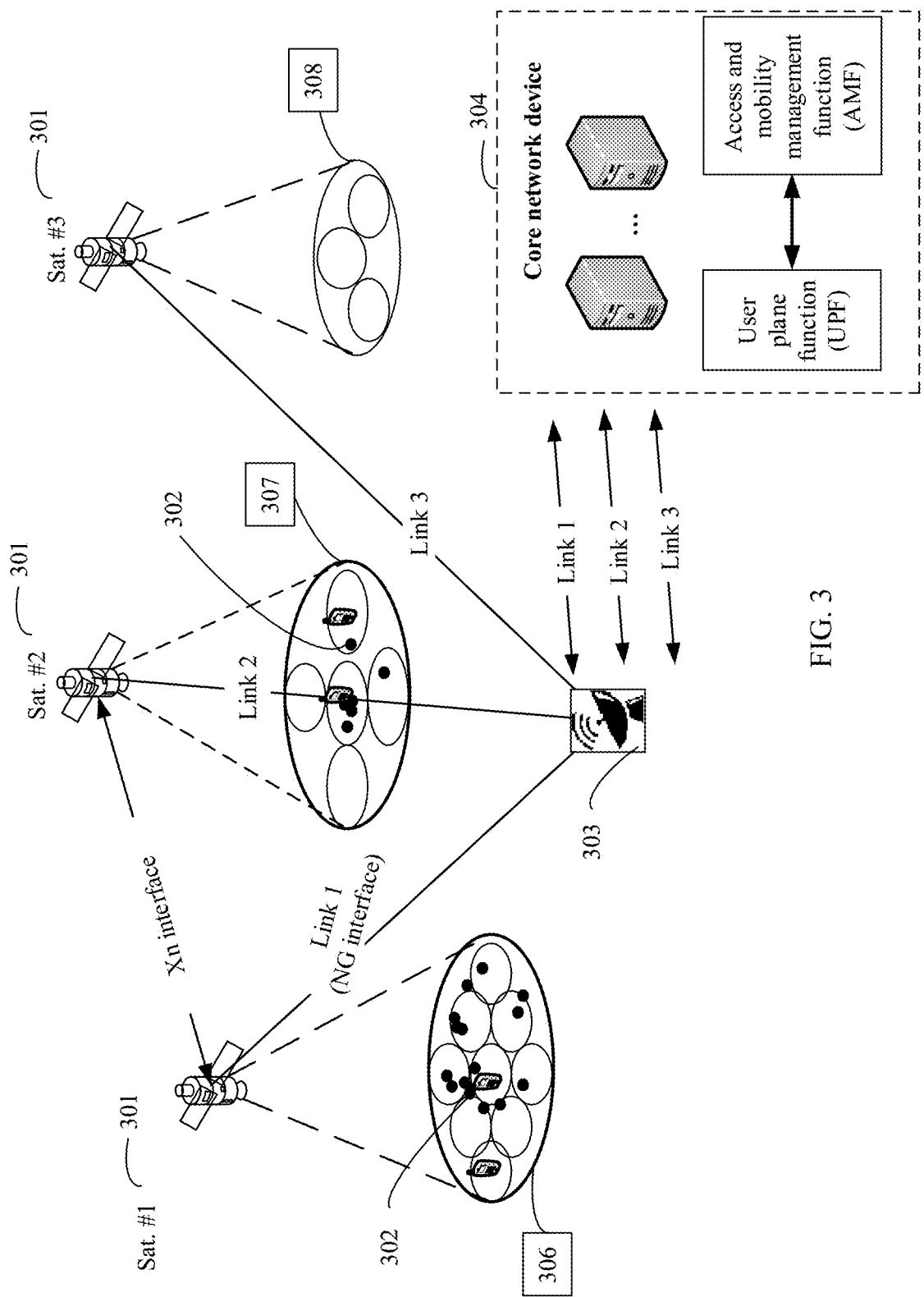
FIG. 3 is a schematic diagram of a mobile satellite communications system architecture according to an embodiment of this application.

For example, FIG. 3 is a schematic diagram of a possible mobile satellite communications system architecture applicable to this application. If a satellite communications system is compared with a terrestrial communications system, a satellite may be considered as one or more network devices on the ground, such as a base station. Therefore, in this application, the satellite is also referred to as a satellite base station, and meanings of the two terms are not distinguished. The satellite provides a communication service for a mobile terminal, and the satellite may further be connected to a core network device (such as an AMF). In this scenario, the satellite may be a non-geostationary earth orbit satellite, or may be a geostationary orbit earth satellite. As shown in FIG. 3, a satellite system 300 mainly includes: satellites 301 (Sat. #1, Sat. #2, and Sat. #3), terminal devices 302 (a black spot in a cell in the figure also indicates a terminal device), a terrestrial station 303, and a core network device 304 (the core network device further includes a user plane function UPF unit and an access and mobility management AMF unit). The system shown in this embodiment of this application includes three satellites. However, an actual quantity of satellites is not limited to three, or may be one, two, or more, and may be determined based on an ephemeris (ephemeris) and a satellite load status. In the figure, coverage areas of the three satellites are different in user density. A coverage area set 306 of a satellite beam of the satellite Sat. #1 is an area of high user density, and communications load of the satellite Sat. #1 is high. A coverage area set 307 of a satellite beam of the satellite Sat. #2 is an area with sparse users, and communications load of the satellite Sat. #2 is low. A coverage area set 308 of a satellite beam of the satellite Sat. #3 is an unmanned area with scarcely any user, and the satellite Sat. #3 basically has no communications load.

A wireless link (an NG interface, where the NG interface is an interface between a satellite base station and a terrestrial station (a core network), and is mainly used for interacting signaling such as a NAS of the core network and service data of a user) established between the satellite Sat. #1 and the terrestrial station 303 is denoted as Link 1. Similarly, wireless links established by the satellite Sat. #2 and the satellite Sat. #3 with the terrestrial station 303 are denoted as Link 2 and Link 3. The terrestrial station 303 is mainly configured to forward signaling and service data between the satellite and a core network. The UPF is one of user plane function entities of the core network, and is responsible for data transmission and traffic statistics collection. A link established between the satellite Sat. #1 and the core network (UPF) is also referred to as Link 1. A link established between the satellite Sat. #2 and the UPF and a link established between the satellite Sat. #3 and the UPF are denoted as Link 2 and Link 3. In addition, there is also a wireless link between the satellites 301. Signaling interaction and user data transmission between satellites are implemented by using an Xn interface (the Xn interface is an interface between satellite base stations, and is mainly used for signaling interaction such as handover).

For ease of understanding of the embodiments of this application, an application scenario of this application is described below. A service scenario described in the embodiments of this application is intended to describe the technical solutions of the embodiments of this application more clearly, and does not constitute a limitation on the technical solutions provided in the embodiments of this application. It may be learned by a person of ordinary skill in the art that, with emergence of a new service scenario, the technical solutions provided in the embodiments of this application are also applicable to a similar technical problem.

Figure 4:
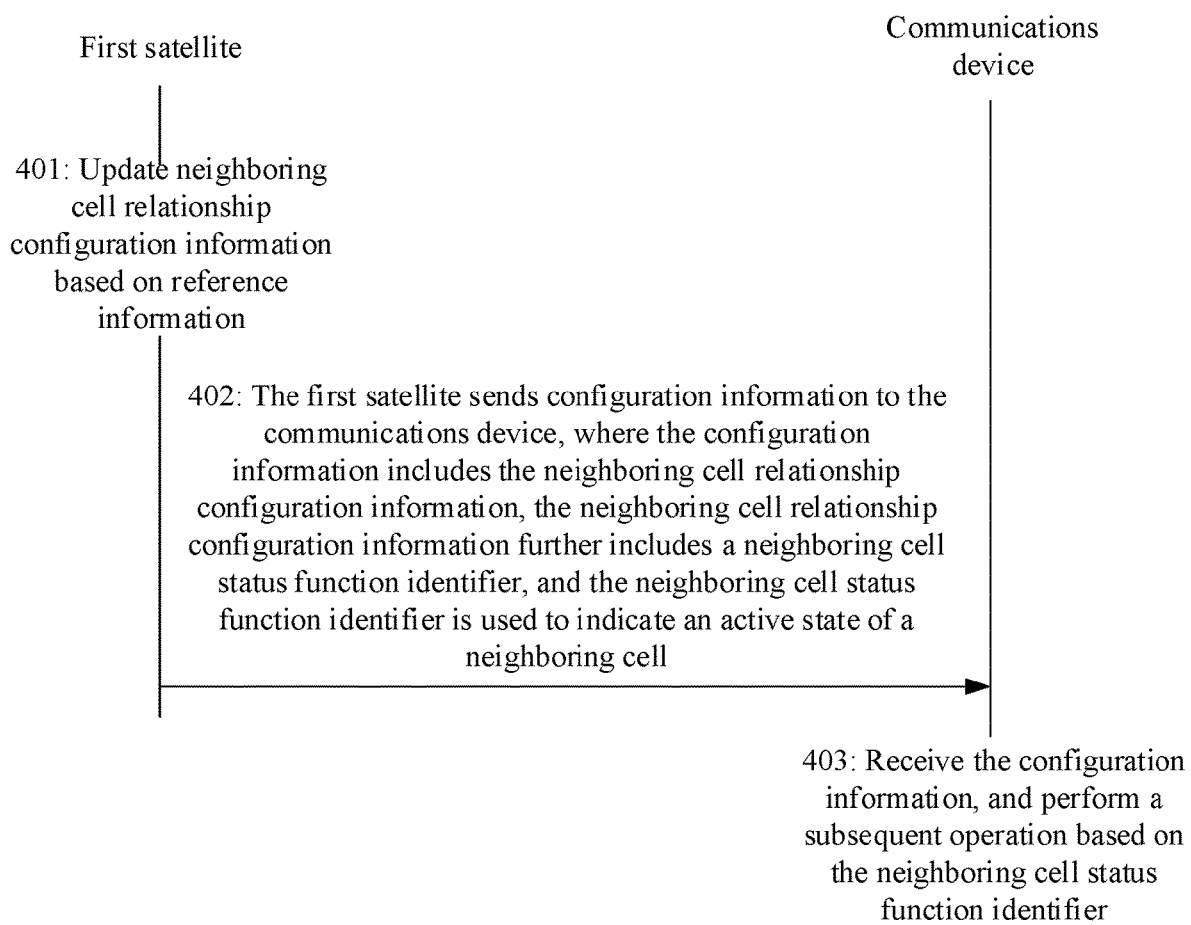
FIG. 4 is a schematic diagram of a neighboring cell relationship implementation method applicable to a satellite network according to an embodiment of this application.

As shown in FIG. 4, this application provides a neighboring cell relationship implementation method applicable to a satellite network. A neighboring cell relationship maintaining procedure of the satellite network is described in detail. A first satellite in FIG. 4 may be any satellite 301 (Sat. #1, Sat. #2, or Sat. #3) in FIG. 3. A communications device in FIG. 4 may be the terminal device 302 in FIG. 3, or may be another satellite in FIG. 3.

Specific steps of the implementation method are as follows:

Step 401 (an optional step): A first satellite generates a neighboring cell status function identifier based on reference information.

Step 402: The first satellite sends neighboring cell relationship configuration information to a communications device, where the neighboring cell relationship configuration information includes the neighboring cell status function identifier.

Step 403: The communications device receives the neighboring cell relationship configuration information sent by the first satellite, and performs a subsequent operation based on the neighboring cell status function identifier included in the neighboring cell relationship configuration information.

Figure 2:
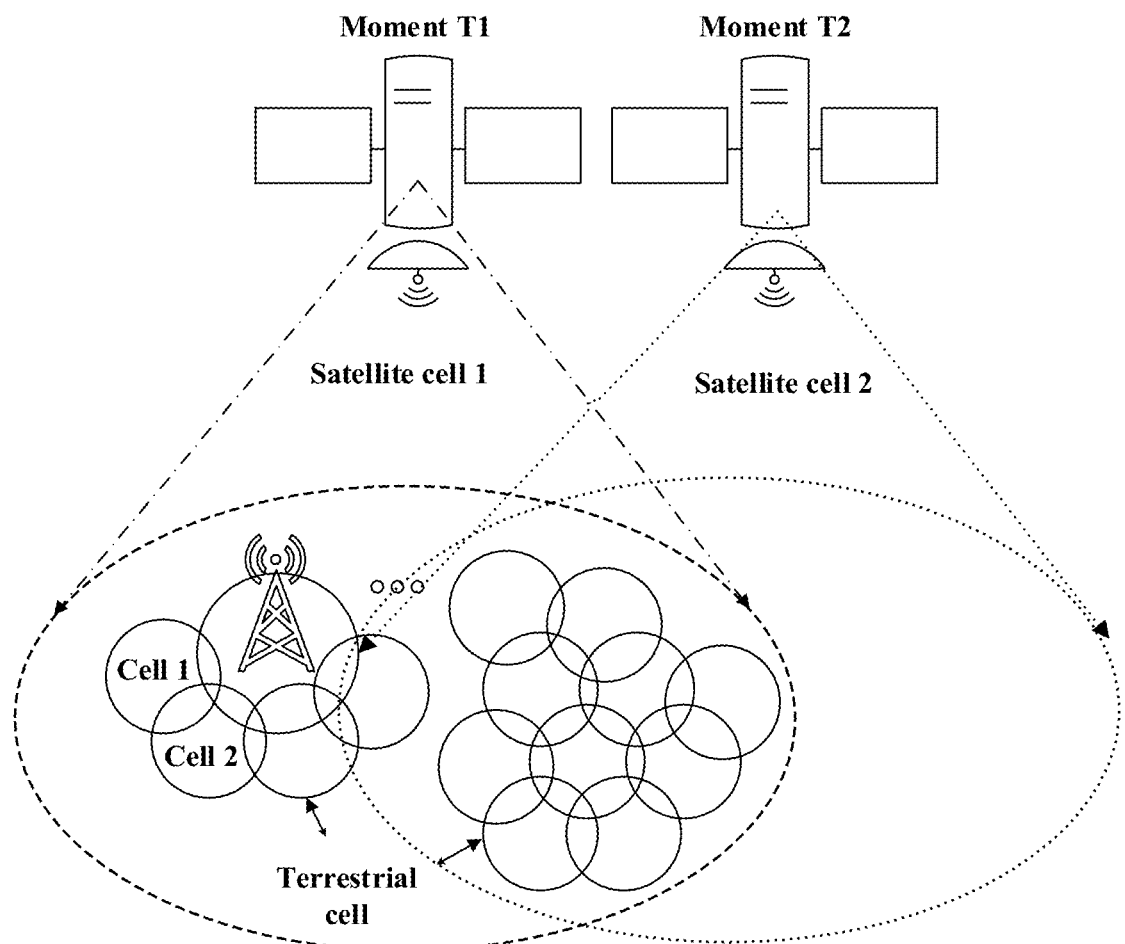
FIG. 2 is a schematic diagram of change situations of terrestrial neighboring cells of a satellite cell at a moment T1 and a moment T2.

Specifically, in the foregoing steps, the neighboring cell relationship configuration information may be sent in another piece of configuration information, the neighboring cell relationship configuration information includes the neighboring cell status function identifier, and the neighboring cell status function identifier is used to indicate an inactive state of at least one neighboring cell of a first satellite cell. The first satellite cell is a cell covered by a beam of the first satellite at a specific moment or in a specific state. For example, with reference to FIG. 2, the first satellite cell is a cell covered by a beam of the first satellite at a moment T2, and a terrestrial cell 1 and a terrestrial cell 2 are neighboring cells of the first satellite cell. In the foregoing neighboring cell relationship implementation method, the first satellite may alternatively be another communications device. This is not limited in this application. In addition, the subsequent operation performed by the communications device based on the neighboring cell status function identifier included in the neighboring cell relationship configuration information in step 403 includes: The communications device determines a configuration status of a corresponding neighboring cell based on the neighboring cell relationship configuration information. The satellite updates the neighboring cell relationship configuration information based on the reference information at an appointed time or periodically. The reference information is described in the following specific embodiments.

Figure 5:
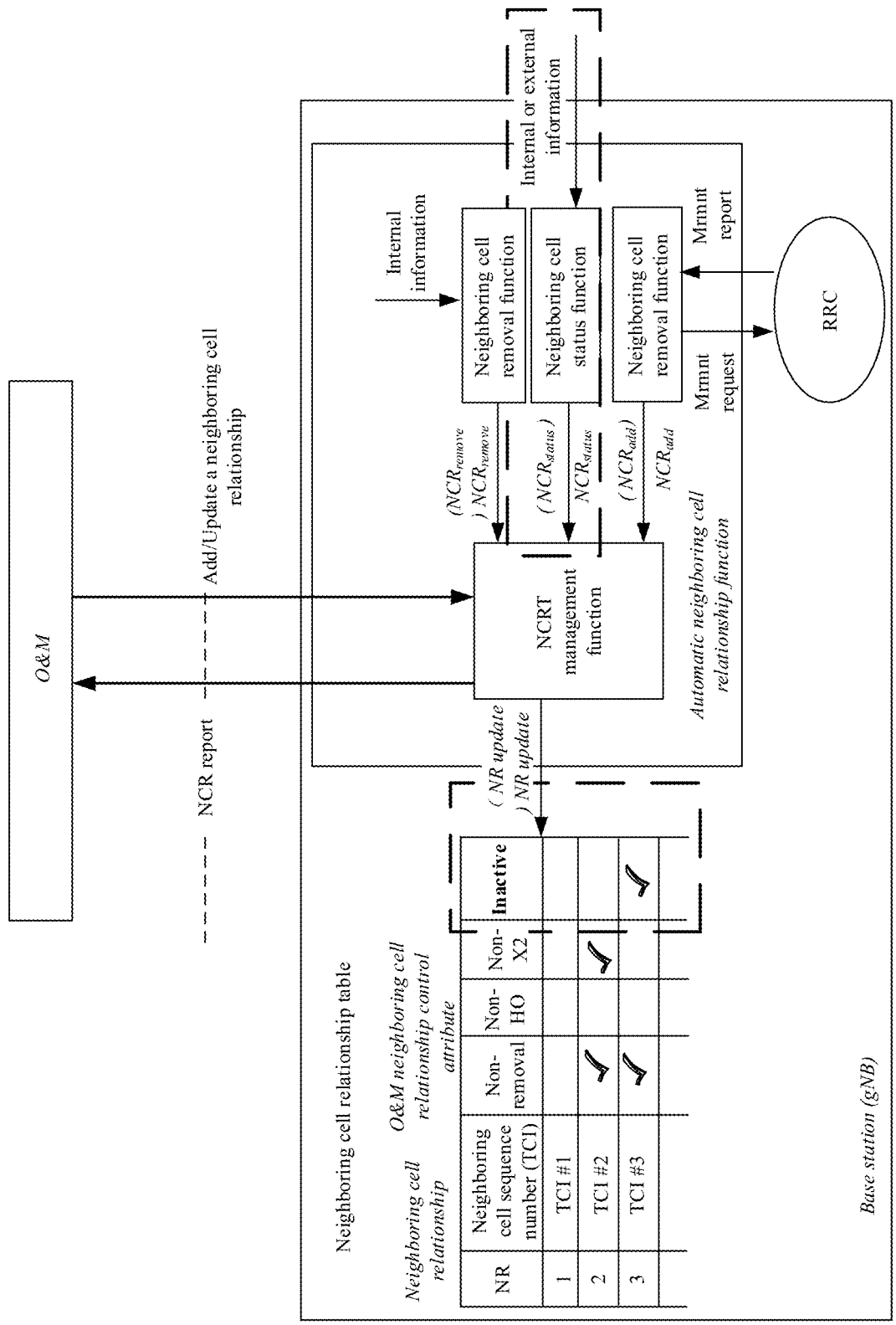
FIG. 5 is a schematic diagram of implementing an automatic neighboring cell relationship ANR function of a satellite network according to an embodiment of this application.

In a specific embodiment, a method for implementing an automatic neighboring cell relationship ANR function of the satellite network is provided. As shown in FIG. 5, a neighboring cell status function (Neighbor Status Function, NSF) is added to the ANR function of the satellite network, and the NSF is used to change an active state of a current neighboring cell; in other words, the NSF is used to determine whether the current neighboring cell is active. Input of the neighboring cell status function NSF is the reference information. The reference information may include internal information and/or external information. The internal information may be capability information of a neighboring cell (for example, storage space of the neighboring cell, an X2 interface capability of a satellite, and a computing capability of the neighboring cell). The external information may be ephemeris information, feedback information sent after UE performs measurement (In addition to a neighboring cell configured on a network side, the UE may also feed back, after measurement, whether a cell is a neighboring cell. Specifically, to update a neighboring cell relationship table of a serving cell, in a connected (connected) state, the network device delivers an instruction to the UE, and the UE performs measurement at an interval at which there is no data transmission task, to obtain feedback information), or the like. Output of the neighboring cell status function NSF is an active state of the neighboring cell, namely, a neighboring cell relationship status (NCR status), and is used to configure an inactive (Inactive) state field corresponding to a neighboring cell in a neighboring cell relationship table (Neighbor Cell Relationship Table, NCRT). The storage space is used as an example. If storage space of a current cell whose neighboring cell relationship is to be updated is relatively small, a quantity of neighboring cells stored in the neighboring cell relationship table may be reduced. Otherwise, the quantity of neighboring cells stored in the neighboring cell relationship table may be increased. A header field of the automatic neighboring cell relationship table includes: an NR number, a neighboring cell sequence number (TCI), non-removal, non-HO, and non-X2. Meanings of the NR number and the neighboring cell sequence number may be understood with reference to the following embodiments. The NR number is used to indicate a neighboring cell relationship (Neighbour Relationship) number; the non-removal field is used to indicate whether a selected neighboring cell can be removed from the neighboring cell relationship table; the non-HO field is used to indicate that the selected neighboring cell cannot be used as a target cell for handover; and the non-X2 field is used to indicate whether there is an X2 interface between a current satellite cell and the neighboring cell. An inactive (Inactive) state entry field is added to the automatic neighboring cell relationship table. If this entry is selected (or set to 1), it indicates that the neighboring cell is a currently inactive neighboring cell, and the neighboring cell cannot be used as a target cell for handover, cell reselection, and the like. If this entry is not selected (or set to 0), it indicates that the neighboring cell is a currently active neighboring cell, and the neighboring cell can be used as a target cell for handover, cell reselection, and the like.

It is easy to understand that an inactive (Inactive) state field in the NCRT may be designed in a plurality of forms. For example, the inactive (Inactive) state field may alternatively be replaced with an active (Active) state field. When this field of a specific neighboring cell is selected, it indicates that the neighboring cell is activated; otherwise, the neighboring cell is inactivated. In another example, an active state of the neighboring cell is still identified based on the inactive (Inactive) state entry, but a difference from the foregoing descriptions is as follows: If the field is set to 0, it indicates that the neighboring cell is a currently inactive neighboring cell. If the field is set to 1, it indicates that the neighboring cell is a currently active neighboring cell. Other forms are not enumerated.

When a neighboring cell relationship of the satellite dynamically changes (for example, some cells are temporarily disabled but are enabled after a period of time), only a value of the inactive state in the NCRT needs to be changed, and a neighboring cell addition function and a neighboring cell removal function do not need to be frequently performed. Therefore, signaling overheads are reduced.

Optionally, on a receiver side, a user receives, by using a broadcast message (such as an SIBx) or a radio resource control RRC message, configuration information that includes and indicates a neighboring cell activation status, or may receive, by using an Xn interface application protocol XnAP, configuration information that includes the indication. Consistent with the foregoing content, if the neighboring cell status function identifier indicates that the neighboring cell activation status is an active (Active) state, the current neighboring cell is an available neighboring cell and can be used for cell handover or reselection; and if the neighboring cell status function identifier indicates that the current neighboring cell is in an inactive (Inactive) state, the current cell is an unavailable neighboring cell and cannot be used as a target cell for handover or reselection.

The neighboring cell relationship table NCRT is further designed or modified based on the foregoing specific embodiment. As shown in FIG. 6, for input information for determining the neighboring cell relationship configuration information, still refer to input information in the foregoing specific embodiment. However, during configuration of a neighboring cell relationship table, an inactive (Inactive) state field corresponding to the neighboring cell corresponds to duration (a time interval) of the inactive state. Specifically, the inactive (Inactive) state field may indicate a start time point and an end time point of the inactive state of the neighboring cell; or the field may indicate a start time point of the inactive state of the neighboring cell and duration (an offset) of the inactive state of the neighboring cell based on the start time point; or the field may indicate a plurality of start time points of the inactive state of the neighboring cell and duration (an offset) of the inactive state of the neighboring cell based on the plurality of start time points; or the field may indicate a start time point and an end time point of the inactive state of the neighboring cell, a time offset of the inactive state of the neighboring cell based on the start time point, and a time offset of the inactive state of the neighboring cell based on the end time point. In this design, compared with the foregoing example, in addition to indicating whether the neighboring cell is in the active state, a duration situation of the inactive state may be further indicated. Therefore, indication information is richer, and frequent signaling overheads caused by a dynamic neighboring cell relationship change are also reduced. In another implementation, the communications device may first determine the inactive state of the neighboring cell, and if the neighboring cell has the inactive state, determine, from a corresponding field, a time interval at which the inactive state lasts.

Figure 7:
FIG. 7 is a schematic diagram of a neighboring cell relationship maintaining method based on a neighboring cell group according to an embodiment of this application.

FIG. 7 is a schematic diagram of a neighboring cell relationship maintaining method based on a neighboring cell group disclosed in this application. In this method, a neighboring cell relationship table NCRT is designed to indicate active states of a plurality of associated neighboring cells. For input information for determining neighboring cell relationship configuration information, still refer to input information in the foregoing specific embodiment. Details are not described again. Specifically, a plurality of bits are used to indicate an inactive (Inactive) field in the NCRT. A sequence number in an entry in this field may be used to indicate an inactive state of one or more associated neighboring cells. It is easy to understand that when one bit is used to indicate an active state of a specific neighboring cell, the method may be degraded into the method in the foregoing embodiment. It can also be understood that the method based on the neighboring cell group in FIG. 7 is compatible with the foregoing specific embodiment, and may be used only in some neighboring cell TCIs in the neighboring cell relationship table NCRT. Inactive state indication information based on the neighboring cell group may be formed by combining inactive state indication information of all neighboring cells in the neighboring cell group in sequence or in a new manner, to maintain neighboring cell groups in a unified manner, simplify entries, and reduce indication information overheads.

In the schematic diagram of the neighboring cell relationship maintaining method based on the neighboring cell group in FIG. 7, neighboring cell relationship tables NCRTs corresponding to a cell TCI #3 at two moments t1 and t2 and satellite cell location relationships at the two moments are provided. Fourth rows (NR: 3) in the two neighboring cell relationship tables correspond to a same neighboring cell group, and the neighboring cell group includes cells TCI #4 and TCI #5. In a location relationship of a satellite cell at the moment t1 on a bottom left side of FIG. 7, neighboring cells of the TCI #3 are TCI #1, TCI #2, and TCI #4. When the moment t2 arrives, in a position relationship of the satellite cell at the moment t2 on a bottom right side of FIG. 7, it is found that there is an overlapping area between cells of a satellite 1 and a satellite 2, and the overlapping cell TCI #4 needs to be disabled (or the cell TCI #5 may be disabled). Therefore, at the moment t2, the neighboring cells of the TCI #3 are updated to the TCI #1, the TCI #2, and the TCI #5. Therefore, the TCI #4 and the TCI #5 may be maintained as a neighboring cell group, to facilitate update of a neighboring cell relationship. After a neighboring cell relationship corresponding to the cell TCI #3 is understood, the TCI #4 and the TCI #5 are added to the neighboring cell relationship table as a neighboring cell group. A value of an inactive state field of the neighboring cell group at the moment t1 may be represented by 01, and the value represents an active state of the neighboring cell TCI #4 and an inactive state of the neighboring cell TCI #5. In other words, the value is presented by arranging the active states of the two cells in sequence. Consistent with the foregoing descriptions, a value of an inactive state field of the neighboring cell group at the moment t2 may be represented by 10, and the value represents an inactive state of the neighboring cell TCI #4 and an active state of the neighboring cell TCI #5. Certainly, there are also a plurality of methods for identifying an active state of the neighboring cell group. In these methods, a coupling relationship between an active cell and an inactive cell needs to be expressed, for example, being the same or mutually exclusive. In another method, one bit is directly used to represent an activation relationship between the TCI #4 and the TCI #5 in the neighboring cell group. For example, a value 0 indicates an active state of the neighboring cell TCI #4 and an inactive state of the neighboring cell TCI #5, and a value 1 indicates an inactive state of the neighboring cell TCI #4 and an active state of the neighboring cell TCI #5. Certainly, this needs to be agreed on in a protocol.

In this design, a neighboring cell group maintaining method is added, to indicate activation statuses of a plurality of associated neighboring cells, facilitate maintenance of the plurality of associated cells, and reduce indication information overheads.

Figure 8:
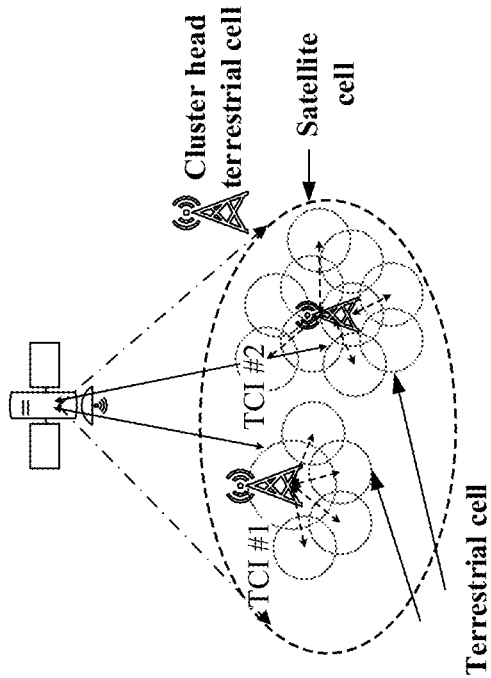
FIG. 8 is a schematic diagram of a neighboring cell relationship maintaining method based on a cluster head terrestrial cell according to an embodiment of this application.

FIG. 8 is a schematic diagram of a neighboring cell relationship maintaining method based on a cluster head terrestrial cell disclosed in this application. A left side of FIG. 8 is a schematic diagram of a satellite-cluster head terrestrial cell-terrestrial cell relationship. A right side of FIG. 8 shows a neighboring cell relationship table based on a cluster head terrestrial cell according to this application. In this method, a neighboring cell relationship table NCRT is designed, to indicate whether one or more neighboring cells are cluster head terrestrial cells, and to indicate activation statuses of the cluster head terrestrial cells. For input information for determining neighboring cell relationship configuration information, still refer to input information in the foregoing specific embodiment. Details are not described again. Specifically, in addition to an inactive state field, the neighboring cell relationship configuration information further includes indication information of a cell type. A type (Type) field in the table on the right side of FIG. 8 indicates a neighboring cell selected as the cluster head terrestrial cell. A satellite may choose to maintain only a neighboring cell relationship with the cluster head terrestrial cell, and a rule for selecting the cluster head terrestrial cell includes but is not limited to at least one item of the following content: a maximum visible time window, a base station communications capability (for example, whether there is an Xn interface with the satellite), a geographical location, or the like.

In one specific implementation:
(1) The satellite selects some terrestrial cells as cluster head terrestrial cells, and the satellite maintains only a neighboring cell relationship with the cluster head terrestrial cell.
(2) The cluster head terrestrial cell maintains a neighboring cell relationship with a terrestrial cell within a range of a cluster head.

It can be understood that, in the foregoing implementation method, selection of the cluster head terrestrial cell may be completed in advance. For example, a terrestrial control center selects the cluster head terrestrial cell in advance, and the satellite does not need to separately determine the cluster head terrestrial cell.

In the schematic diagram of the satellite-cluster head terrestrial cell-terrestrial cell relationship on the left side of FIG. 8, macro base stations TCI #1 and TCI #2 are selected as cluster head terrestrial cells based on coverage areas of the base stations. In a neighboring cell relationship table NCRT of a satellite cell, only neighboring cell relationships with the TCI #1 and the TCI #2 are maintained, and another terrestrial cell within the range of the cluster head does not need to be maintained. Based on the foregoing design, a field indicating a neighboring cell type is added to the neighboring cell relationship table: Type (Type). If the field is selected, or a value such as 1 is assigned, it indicates that the neighboring cell is a cluster head terrestrial cell. If the field is not selected, or another value such as 0 is assigned, it indicates that the neighboring cell is a non-cluster head terrestrial cell. When a terrestrial neighboring cell relationship within a range of a specific cluster head needs to be queried, the satellite neighboring cell may initiate a request to the cluster head terrestrial cell based on information such as a location, and obtain neighboring cell configuration of a corresponding terrestrial cell by using the cluster head terrestrial cell.

It is easy to figure out that a neighboring cell relationship table maintaining method based on the cluster head terrestrial cell may be integrated with the foregoing method. For example, cluster head terrestrial cells may be some or all neighboring cells in the neighboring cell relationship table based on the neighboring cell group, or out of some consideration, in the neighboring cell relationship table design shown in FIG. 5, some or all neighboring cells may be cluster head terrestrial cells, and these neighboring cells with cluster head attributes may be distinguished from common neighboring cells by using indication information.

In a design of the neighboring cell relationship table, a cluster-based neighboring cell maintaining method is disclosed. A newly added field indicates a cluster head terrestrial cell, and the satellite needs to maintain only a neighboring cell relationship of a cluster head. Storage overheads of the neighboring cell relationship table NCRT are reduced.

Figure 9:
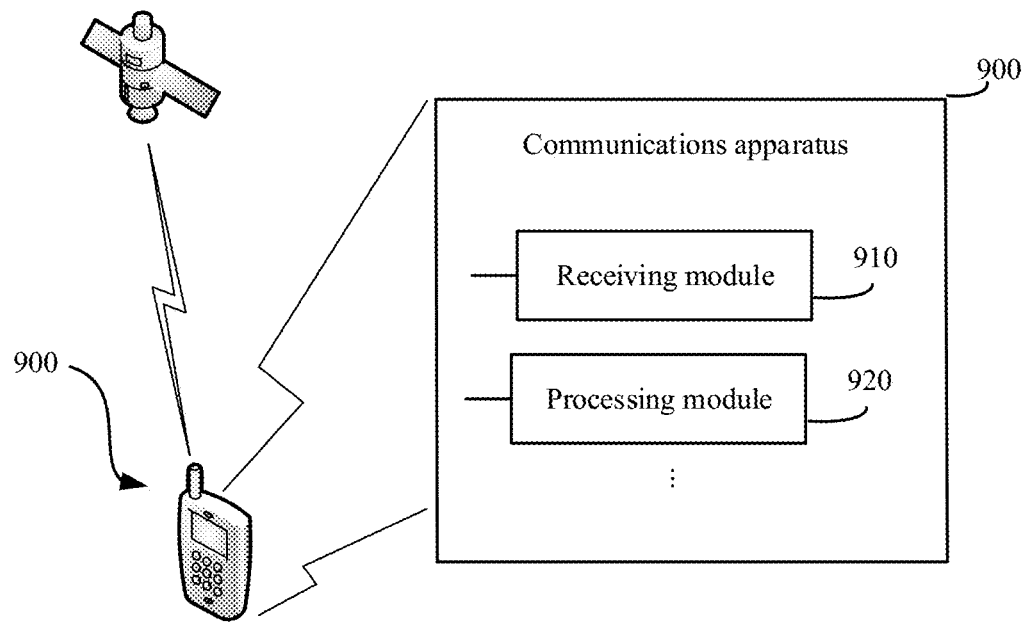
FIG. 9 shows a communications apparatus 900 according to an embodiment of this application.

Based on a same technical concept as the foregoing communication implementation method, as shown in FIG. 9, a communications apparatus 900 is provided, and the communications apparatus may be used for satellite communications. The communications apparatus 900 can perform steps performed by the communications apparatus in the method in FIG. 4. To avoid repetition, details are not described herein again. In a design, the apparatus may include modules that are in a one-to-one correspondence with the method/operations/steps/actions described in FIG. 4. The modules may be implemented by a hardware circuit, software, or a combination of the hardware circuit and the software. In a design, the communications apparatus 900 may be a communications apparatus or a chip applied to a communications apparatus. The communications apparatus 900 includes a receiving module 910, and optionally, further includes a processing module 920 and a storage module 930 (not shown in the figure). The processing module 920 may be separately connected to the storage module 930 and the receiving module 910, and the storage module 930 may also be connected to the receiving module 910.

The storage module 930 is configured to store a computer program. More specifically, a memory may be used to perform a function of the storage module 930. A specific type of the memory is described below.

For example, the receiving module 910 is configured to receive neighboring cell relationship configuration information, the neighboring cell relationship configuration information includes a neighboring cell status function identifier, and the neighboring cell status function identifier is used to indicate an inactive state of at least one neighboring cell of a first satellite cell. More specifically, an antenna, a radio frequency module, a transceiver, or a combination of the foregoing devices may be used to perform a function of the receiving module 910.

The processing module 920 is configured to identify the indicated inactive state of the neighboring cell based on all or some computer programs stored in the storage module 930; in other words, the processing module 920 determines a configuration status of the corresponding neighboring cell based on the neighboring cell relationship configuration information. More specifically, a processor or a processing chip may be used to perform a function of the processing module 920. A specific type of the processor or the processing chip is described below.

Figure 10:
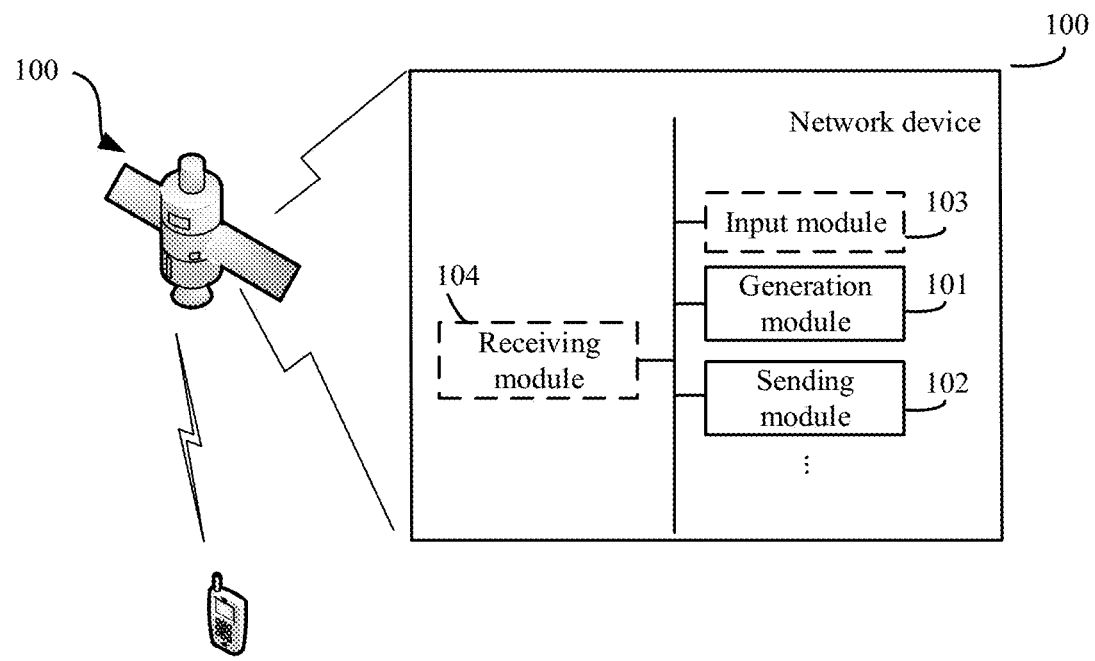
FIG. 10 shows a network device 100 according to an embodiment of this application.

Based on a same technical concept as the foregoing communication implementation method, FIG. 10 is a schematic block diagram of a network device 100 according to an embodiment of this application. The network device may be used for satellite communication. It should be understood that the network device 100 can perform steps performed by the first satellite in the method in FIG. 4. To avoid repetition, details are not described herein again. In a design, the apparatus may include modules that are in a one-to-one correspondence with the method/operations/steps/actions described in FIG. 4. The modules may be implemented by a hardware circuit, software, or a combination of the hardware circuit and the software. In a design, the network device 100 includes a generation module 101 and a sending module 102. Optionally, the network device 100 also includes an input module 103 and a receiving module 104. During specific implementation, the sending module 102 and the receiving module 104 may be a same module: a transceiver module.

The generation module 101 is configured to generate a neighboring cell status function identifier, where the neighboring cell status function identifier is used to indicate an inactive state of at least one neighboring cell of a first satellite cell. More specifically, a processor or a processing chip may be used to perform a function of the generation module 101. A specific type of the processor or the processing chip is described below.

The sending module 102 is configured to send neighboring cell relationship configuration information, where the neighboring cell relationship configuration information includes the neighboring cell status function identifier. More specifically, an antenna, a radio frequency module, a transceiver, or a combination of the foregoing devices may be used to perform a function of the sending module 102.

Optionally, the network device 100 further includes the input module 103, and the input module is configured to input reference information. The generation module is configured to generate the neighboring cell status function identifier based on the reference information, and the reference information includes at least one item of the following content: storage space of the neighboring cell, a computing capability of the neighboring cell, an X2 interface capability, and ephemeris information. More specifically, a chip pin or a dedicated communications module may be used to perform a function of the input module 103.

Optionally, the sending module 102 is configured to send a request to a cluster head terrestrial cell, and the request enables the cluster head terrestrial cell to feed back neighboring cell relationship configuration information of a cell associated with the cluster head terrestrial cell. The receiving module 104 is configured to receive the neighboring cell relationship configuration information that is of the cell associated with the cluster head terrestrial cell and that is fed back by the cluster head terrestrial cell. More specifically, an antenna, a radio frequency module, a transceiver, or a combination of the foregoing devices may be used to perform a function of the receiving module 104.

Figure 11:
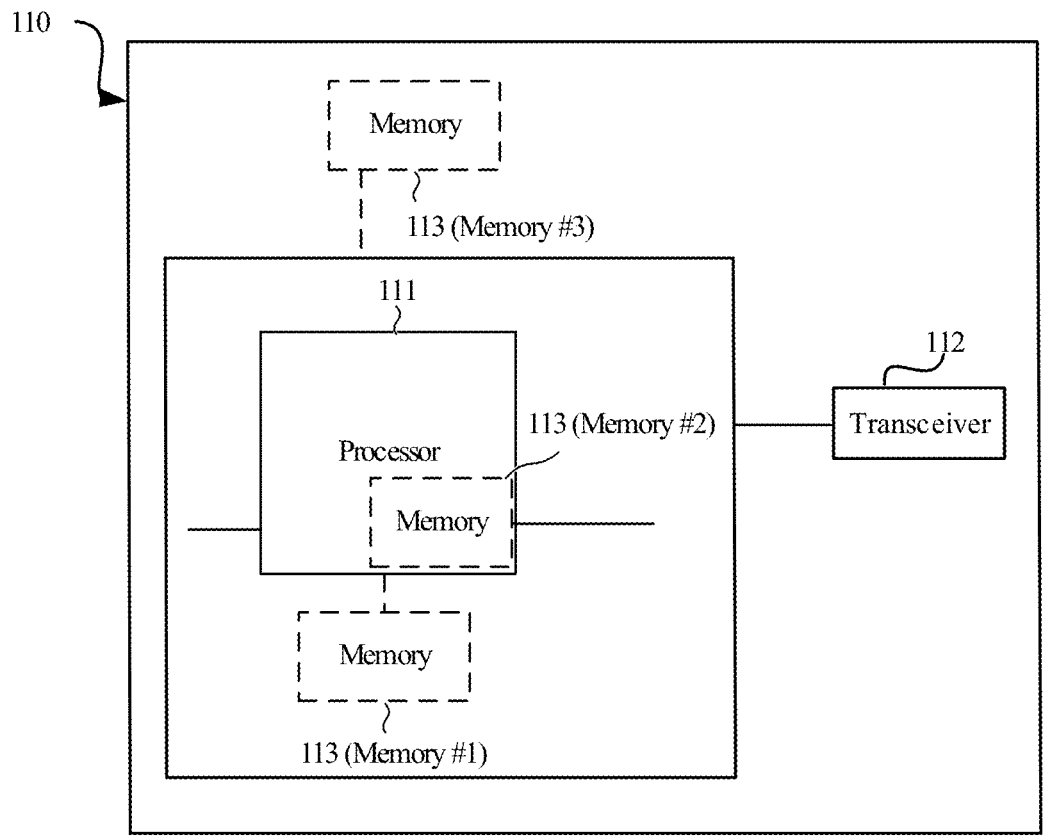
FIG. 11 shows a communications apparatus 110 according to an embodiment of this application.

FIG. 11 is a schematic block diagram of a communications apparatus 110 according to an embodiment of this application. It should be understood that the communications apparatus 110 can perform steps performed by the first satellite or the communications device in the method in FIG. 4. To avoid repetition, details are not described herein again. The communications apparatus 110 includes a processor 111 and a memory 113, and the processor 111 and the memory 113 are electrically coupled.

The memory 113 is configured to store computer program instructions. Optionally, the memory 113 (Memory #1) is disposed in the apparatus, the memory 113 (Memory #2) is integrated with the processor 111, or the memory 113 (Memory #3) is disposed outside the apparatus.

The processor 111 is configured to execute some or all computer program instructions in the memory, and when the some or all computer program instructions are executed, the apparatus is enabled to perform the method in any one of the foregoing embodiments.

Optionally, the communications apparatus further includes: a transceiver 112, configured to communicate with another device. For example, the transceiver 112 receives a first message sent by the first satellite.

It should be understood that the communications apparatus 110 shown in FIG. 11 may be a chip or a circuit. For example, the communications apparatus 110 may be a chip or a circuit disposed in a first satellite or a communications device. Alternatively, the transceiver 112 may be a communications interface. The transceiver includes a receiver and a transmitter. Further, the communications apparatus 110 may include a bus system.

The processor 111, the memory 113, and the transceiver 112 are connected through the bus system. The processor 111 is configured to execute the instructions stored in the memory 113, to control the transceiver to receive a signal and send a signal, and complete steps of the first satellite or the communications device in the implementation in this application. The memory 113 may be integrated into the processor 111, or may be disposed separately from the processor 111.

In an implementation, it may be considered that functions of the transceiver 112 are implemented by using a transceiver circuit or a dedicated transceiver chip. It may be considered that the processor 111 may be implemented by using a dedicated processing chip, a processing circuit, a processor, or a general-purpose chip. The processor may be a central processing unit (central processing unit, CPU), a network processor (network processor, NP), or a combination of the CPU and the NP. The processor may further include a hardware chip or another general-purpose processor. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), general array logic (generic array logic, GAL) and another programmable logic device, a discrete gate or transistor logic device, a discrete hardware component, or any combination thereof. The general-purpose processor may be a microprocessor, or the processor may be any conventional processor or the like.

It should further be understood that the memory mentioned in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application aims to include but is not limited to these memories and any memory of another proper type.

An embodiment of this application provides a computer storage medium. The computer storage medium stores a computer program, and the computer program includes instructions used to perform the foregoing communication method.

An embodiment of this application provides a computer program product including instructions. When the computer program product runs on a computer, the computer is enabled to perform the foregoing provided communication method.

Figure 12:
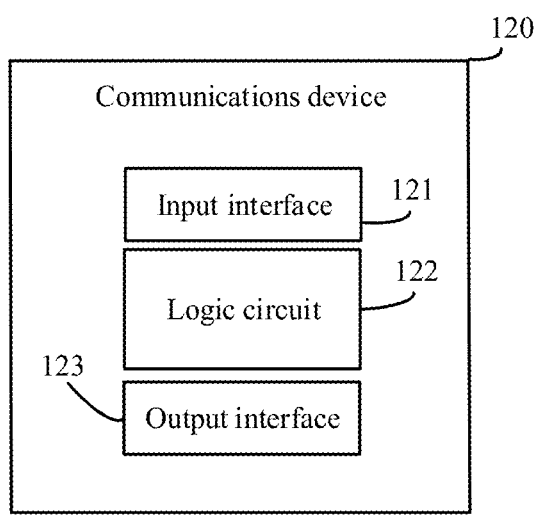
FIG. 12 shows a communications apparatus 120 according to an embodiment of this application.

FIG. 12 shows a communications apparatus 120 according to an embodiment of this application. The communications apparatus may be configured to perform the foregoing neighboring cell relationship implementation method and specific embodiments that are applicable to the satellite network. The apparatus may be a communications device or a chip in the communications device. As shown in FIG. 12, the apparatus includes at least one input interface (Input(s)) 121, a logic circuit 122, and at least one output interface (Output(s)) 123.

The input interface 121 is configured to obtain neighboring cell relationship configuration information, the neighboring cell relationship configuration information includes a neighboring cell status function identifier, and the neighboring cell status function identifier is used to indicate an inactive state of at least one neighboring cell of a first satellite cell.

The logic circuit 122 is configured to determine a configuration status of the neighboring cell based on the neighboring cell relationship configuration information.

The output interface 123 is configured to output the configuration status of the neighboring cell.

Optionally, the logic circuit 122 may be a chip, an encoder, an encoding circuit, or another integrated circuit that can implement the method in this application.

Specific methods and embodiments have been described above, and the apparatus 120 is only configured to perform a neighboring cell relationship configuration method. Therefore, for specific descriptions of the configuration method, especially a function of the logic circuit 122 or the output interface 123, refer to a related part of a corresponding embodiment. Details are not to be repeated herein.

Figure 13:
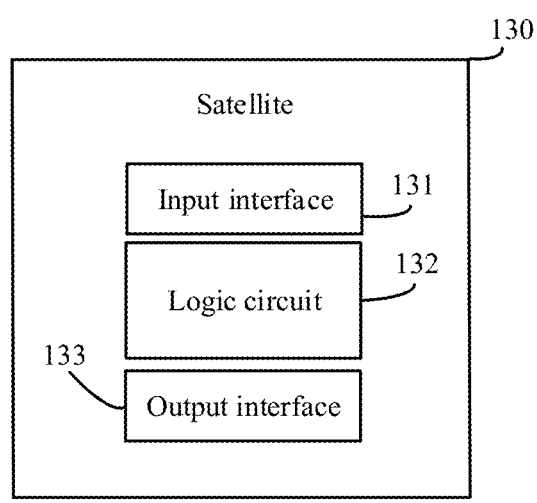
FIG. 13 shows a communications apparatus 130 according to an embodiment of this application.

FIG. 13 shows an apparatus 130 for image decoding according to an embodiment of this application. The apparatus 130 may be configured to perform the foregoing neighboring cell relationship implementation method and specific embodiments that are applicable to the satellite network. The apparatus may be a satellite or a communications chip in the satellite. As shown in FIG. 13, the apparatus includes at least one input interface (Input(s)) 131, a logic circuit 132, and at least one output interface (Output(s)) 133.

The input interface 131 is configured to input reference information, and the reference information includes at least one item of the following content: storage space of the neighboring cell, a computing capability of the neighboring cell, an X2 interface capability, and ephemeris information.

The logic circuit 132 is configured to generate the neighboring cell status function identifier based on the reference information, and the neighboring cell status function identifier is used to indicate an inactive state of at least one neighboring cell of a first satellite cell.

The output interface 133 is configured to output neighboring cell relationship configuration information, and the neighboring cell relationship configuration information includes the neighboring cell status function identifier.

Optionally, the logic circuit 132 may be a chip, an encoder, an encoding circuit, or another integrated circuit that can implement the method in this application.

Specific methods and embodiments have been described above, and the apparatus 130 is only configured to perform a neighboring cell relationship configuration method. Therefore, for specific descriptions of the configuration method, especially a function of the logic circuit 132 or the output interface 133, refer to a related part of a corresponding embodiment. Details are not be repeated herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual communication connections may be implemented through some interfaces. The indirect couplings or communication connections between the apparatuses or units may be implemented in electronic, mechanical, or other forms.

In addition, units in the apparatus embodiments of this application may be integrated into one processing unit, or each of the units may exist alone physically, or two or more units may be integrated into one unit.

It may be understood that, the processor in the embodiments of this application may be a central processing unit (central processing unit, CPU), or may be another general-purpose processor, a digital signal processor (digital signal processor, DSP), an application-specific integrated circuit (application specific integrated circuit, ASIC), a field programmable gate array (field programmable gate array, FPGA) or another programmable logic device, a transistor logic device, a hardware component, or any combination thereof. The general-purpose processor may be a microprocessor or any conventional processor.

All or some of the methods in the embodiments of this application may be implemented by software, hardware, firmware, or any combination thereof. When software is used to implement the embodiments, the embodiments may be implemented all or partially in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a dedicated computer, a computer network, or another programmable apparatus. The computer programs or instructions may be stored in a computer-readable storage medium, or may be transmitted via the computer-readable storage medium. The computer-readable storage medium may be any usable medium accessible by a computer, or a data storage device, such as a server integrating one or more usable media. The usable medium may be a magnetic medium such as a floppy disk, a hard disk, or a magnetic tape, or may be an optical medium such as a CD-ROM or a DVD, or may be a semiconductor medium such as a solid-state drive (solid state disk, SSD), a random access memory (random access memory, RAM), a read-only memory (read-only memory, ROM), or a register.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

What is claimed is:

1. A neighboring cell relationship configuration method, wherein the neighboring cell relationship configuration method comprises:

receiving, by a communications device, neighboring cell relationship configuration information, wherein the neighboring cell relationship configuration information comprises a neighboring cell status function identifier, and the neighboring cell status function identifier indicates an inactive state of at least one neighboring cell of a first satellite cell, wherein the neighboring cell relationship configuration information further comprises an indication indicating whether the at least one neighboring cell of the first satellite cell can be used as a target cell for handover, and wherein the neighboring cell relationship configuration information further comprises a neighboring cell cluster head indicator indicating whether the at least one neighboring cell is a cluster head terrestrial cell; and determining, by the communications device, a configuration status of a neighboring cell based on the neighboring cell relationship configuration information.

2. The neighboring cell relationship configuration method according to claim 1, wherein the inactive state of the at least one neighboring cell comprises a time interval of the inactive state of the at least one neighboring cell.

3. The neighboring cell relationship configuration method according to claim 2, wherein the time interval of the inactive state of the at least one neighboring cell comprises at least one item of the following content:
- a start time point of the inactive state of the at least one neighboring cell,
- an end time point of the inactive state of the at least one neighboring cell,
- an offset of the start time point of the inactive state of the at least one neighboring cell, or
- an offset of the end time point of the inactive state of the at least one neighboring cell.

4. The neighboring cell relationship configuration method according to claim 1, wherein the neighboring cell status function identifier indicates inactive states of two neighboring cells of the first satellite cell, and the inactive states of the two neighboring cells are coupled or mutually exclusive.

5. The neighboring cell relationship configuration method according to claim 1, wherein the neighboring cell relationship configuration information is sent in any one of the following manners: a broadcast message, a radio resource control (RRC) message, or an Xn interface application protocol (XnAP).

6. The neighboring cell relationship configuration method according to claim 1, wherein the neighboring cell relationship configuration information further comprises an indication indicating whether the at least one neighboring cell can be removed from the neighboring cell relationship configuration information.

7. The neighboring cell relationship configuration method according to claim 1, wherein the neighboring cell relationship configuration information further comprises an indication indicating whether there is an X2 interface between the first satellite cell and the at least one neighboring cell.

8. The neighboring cell relationship configuration method according to claim 1, wherein the communications device is a terminal device or a satellite.

9. A neighboring cell relationship configuration method, wherein the neighboring cell relationship configuration method comprises:
- generating, by a communications device, a neighboring cell status function identifier, wherein the neighboring cell status function identifier indicates an inactive state of at least one neighboring cell of a first satellite cell; and
- sending, by the communications device, neighboring cell relationship configuration information, wherein the neighboring cell relationship configuration information comprises the neighboring cell status function identifier, wherein the neighboring cell relationship configuration information further comprises an indication indicating whether the at least one neighboring cell of the first satellite cell can be used as a target cell for handover, and wherein the neighboring cell relationship configuration information further comprises a neighboring cell cluster head indicator indicating whether the at least one neighboring cell is a cluster head terrestrial cell.

10. The neighboring cell relationship configuration method according to claim 9, wherein the communications device generates the neighboring cell status function identifier based on reference information, and wherein the reference information comprises at least one item of the following content: storage space of the at least one neighboring cell, a computing capability of the at least one neighboring cell, an X2 interface capability, ephemeris information, or feedback information sent after a terminal performs measurement.

11. The neighboring cell relationship configuration method according to claim 9, wherein the inactive state of the at least one neighboring cell comprises a time interval of the inactive state of the at least one neighboring cell.

12. The neighboring cell relationship configuration method according to claim 11, wherein the time interval of the inactive state of the at least one neighboring cell comprises at least one item of the following content:
- a start time point of the inactive state of the at least one neighboring cell,
- an end time point of the inactive state of the at least one neighboring cell,
- an offset of the start time point of the inactive state of the at least one neighboring cell, or
- an offset of the end time point of the inactive state of the at least one neighboring cell.

13. The neighboring cell relationship configuration method according to claim 9, wherein the neighboring cell status function identifier indicates inactive states of two neighboring cells of the first satellite cell, and the inactive states of the two neighboring cells are coupled or mutually exclusive.

14. The neighboring cell relationship configuration method according to claim 9, wherein the communications device sends a request to the cluster head terrestrial cell, wherein the request enables a communications device in the cluster head terrestrial cell to feed back neighboring cell relationship configuration information of a cell associated with the cluster head terrestrial cell.

15. A communications apparatus, wherein the communications apparatus comprises:
- at least one processor; and
- one or more memories coupled to the at least one processor and storing program instructions for execution by the at least one processor to:
  - receive neighboring cell relationship configuration information, wherein the neighboring cell relationship configuration information comprises a neighboring cell status function identifier, and the neighboring cell status function identifier indicates an inactive state of at least one neighboring cell of a first satellite cell, wherein the neighboring cell relationship configuration information further comprises an indication indicating whether the at least one neighboring cell of the first satellite cell can be used as a target cell for handover, and wherein the neighboring cell relationship configuration information further comprises a neighboring cell cluster head indicator indicating whether the at least one neighboring cell is a cluster head terrestrial cell; and determine a configuration status of a neighboring cell based on the neighboring cell relationship configuration information.

16. The communications apparatus according to claim 15, wherein the inactive state of the at least one neighboring cell comprises a time interval of the inactive state of the at least one neighboring cell.

17. The communications apparatus according to claim 16, wherein the time interval of the inactive state of the at least one neighboring cell comprises at least one item of the following content:
   a start time point of the inactive state of the at least one neighboring cell,
   an end time point of the inactive state of the at least one neighboring cell,
   an offset of the start time point of the inactive state of the at least one neighboring cell, or
   an offset of the end time point of the inactive state of the at least one neighboring cell.

18. The communications apparatus according to claim 15, wherein the neighboring cell status function identifier indicates inactive states of two neighboring cells of the first satellite cell, and the inactive states of the two neighboring cells are coupled or mutually exclusive.

19. The communications apparatus according to claim 15, wherein the communications apparatus receives the neighboring cell relationship configuration information sent by using a broadcast message, a radio resource control (RRC) message, or an Xn interface application protocol (XnAP).

20. A communications apparatus, wherein the communications apparatus comprises:
   at least one processor; and
   one or more memories coupled to the at least one processor and storing program instructions for execution by the at least one processor to:
      generate a neighboring cell status function identifier, wherein the neighboring cell status function identifier indicates an inactive state of at least one neighboring cell of a first satellite cell; and
      send neighboring cell relationship configuration information, wherein the neighboring cell relationship configuration information comprises the neighboring cell status function identifier, wherein the neighboring cell relationship configuration information further comprises an indication indicating whether the at least one neighboring cell of the first satellite cell can be used as a target cell for handover, and wherein the neighboring cell relationship configuration information further comprises a neighboring cell cluster head indicator indicating whether the at least one neighboring cell is a cluster head terrestrial cell.

* * * * *